(12) United States Patent
McEwan (10) Patent No.: US 7,379,016 B1
(45) Date of Patent: May 27, 2008

(54) CARRIER PHASE DETECTION SYSTEM FOR RADAR SENSORS

(75) Inventor: Thomas Edward McEwan, Las Vegas, NV (US)

(73) Assignee: McEwan Technologies, LLC, Las Vegas, NV (US)

( * ) Notice: Subject to any disclaimer, the term of this patent is extended or adjusted under 35 U.S.C. 154(b) by 74 days.

(21) Appl. No.: 11/355,845

(22) Filed: Feb. 16, 2006

(51) Int. Cl.
*G01S 7/00* (2006.01)
*G01S 17/02* (2006.01)
*G01S 7/02* (2006.01)
*G01S 7/48* (2006.01)
*G01S 13/00* (2006.01)
*G01S 17/00* (2006.01)

(52) U.S. Cl. .............. 342/134; 342/21; 342/118; 342/123; 342/124; 342/135; 342/175; 342/195; 73/290 R; 324/600; 324/629; 324/637; 324/642; 324/644; 356/3; 356/4.01; 356/5.01; 356/5.03; 375/238; 375/256; 375/316; 375/340

(58) Field of Classification Search ............... 342/21, 342/22, 27, 28, 82–103, 118, 124, 175, 192–194, 342/195, 196–197; 367/87, 93, 94, 99, 100, 367/118, 124–129; 375/238, 239, 242, 254, 375/256, 259, 285, 316–319, 322, 324–327, 375/340–343, 346, 350, 351, 353; 356/3, 356/3.01–5.15; 324/600, 629, 637, 642, 324/644; 73/290 R, 304 R, 304 C, 290 B
See application file for complete search history.

(56) References Cited

U.S. PATENT DOCUMENTS

| 2,685,068 | A | | 7/1954 | Goubau | |
|---|---|---|---|---|---|
| 3,683,299 | A | | 8/1972 | Vzyatyshev et al. | |
| 4,639,902 | A | * | 1/1987 | Leverance et al. | 367/93 |
| 4,697,184 | A | * | 9/1987 | Cheal et al. | 342/28 |
| 4,897,660 | A | * | 1/1990 | Gold et al. | 342/192 |
| 5,148,178 | A | * | 9/1992 | Holzer et al. | 342/118 |
| 5,457,990 | A | | 10/1995 | Oswald et al. | |
| 5,610,611 | A | * | 3/1997 | McEwan | 342/89 |
| 6,137,438 | A | | 10/2000 | McEwan | |
| 6,191,724 | B1 | | 2/2001 | McEwan | |
| 6,414,627 | B1 | * | 7/2002 | McEwan | 342/118 |
| 6,492,933 | B1 | * | 12/2002 | McEwan | 342/28 |
| 6,535,161 | B1 | * | 3/2003 | McEwan | 342/124 |
| 6,734,819 | B2 | | 5/2004 | Spanke | |
| 7,098,841 | B2 | * | 8/2006 | Hager et al. | 342/118 |

* cited by examiner

Primary Examiner—Bernarr E Gregory (57) ABSTRACT

A pulse detection system for expanded time radar, laser and TDR sensors detects specific cycles within bursts of cycles. A sensor transmits and receives short bursts of RF cycles. A transmit pulse detector triggers on a selected cycle of the detected transmit burst and starts a range counter. A receive detector triggers on a selected cycle within a received echo burst to stop the range counter, thereby indicating range. Cycle selection is enabled by an analysis window of time. The detection system can provide accuracies on the order of one picosecond and is well-suited to accurate ranging along an electromagnetic guide wire.

13 Claims, 6 Drawing Sheets

CARRIER PHASE DETECTION SYSTEM FOR RADAR SENSORS

BACKGROUND OF THE INVENTION

1. Field of the Invention

The present invention relates to radar detection circuits and more particularly to baseband carrier detection circuits for expanded time ranging systems. The invention can be used to accurately detect the time of occurrence of pulsed RF echoes for sampling radar, TDR (Time Domain Reflectometry) and laser sensors.

2. Description of Related Art

Short range, high resolution pulse-echo ranging systems, such as wideband and ultra-wideband pulsed radar and pulsed laser rangefinders often transmit a short sinusoidal burst on the order of 1-nanosecond in duration and consisting of about six cycles of RF. Radars having these parameters can be found in, for example, commercial pulse-echo rangefinders used to determine liquid levels in tanks. These radars operate in an expanded time mode, whereby the transmit pulse rate is slightly higher than the receiver gate, or sampling, rate, to produce a stroboscopic slow motion sampling effect, i.e., a down-sampling, time expansion effect.

The stroboscopic effect produces detected output pulses that resemble the received RF echo pulses, but occur on a vastly expanded time scale. Time expansion factors of 100,000 to 1-million are common. Accordingly, RF echo pulses having a 6 GHz carrier frequency produce sampled output echo pulses having a 6 kHz carrier frequency. These 6 kHz pulses are expanded time replicas of the RF echo pulses. At 6 kHz, pulse detection or other processing is vastly easier. Examples of expanded time radar architectures are disclosed in U.S. Pat. No. 6,191,724, "Short Pulse Microwave Transceiver," by the present inventor, Thomas E. McEwan, and in U.S. Pat. No. 6,414,627, "Homodyne Swept Range Radar," also by the present inventor.

A problem arises in precisely detecting pulsed RF produced by these systems. One sinewave cycle looks very much like the next within a sinewave burst, so a detector has difficulty detecting a particular sinewave cycle within the burst. For best ranging accuracy, the detector must consistently detect one specific cycle within the echo burst. Preferably, one particular point on a selected sinewave cycle must be detected.

One approach to the detection problem is a fixed threshold detector that triggers on the first sinewave cycle to cross the threshold. Unfortunately, variations in received signal amplitude make this approach unattractive since cycle jumps are inevitable as amplitude varies with target range, aspect angle and size.

Another approach is to detect the envelope of the sinusoidal burst and then threshold detect the envelope, with the detection time occurring at a threshold crossing. Alternatively, the envelope's time-of-peak (TOP) can be detected. Yet another technique is constant fractional maximum detection (CFD), wherein a peak detector detects peak amplitude, which is coupled through a voltage divider to set a tracking detection threshold at a constant fraction of the pulse maximum. In all these cases, the envelope is slower and of lower bandwidth than an individual cycle within the burst, and so detection accuracy suffers accordingly. A ten fold reduction in accuracy is not uncommon with these envelope detection techniques.

An automatic sinusoidal burst detection technique is disclosed in U.S. Pat. No. 6,137,438 "Precision Short Range Pulse-Echo Systems with Automatic Pulse Detectors," by the present inventor. A peak detector detects peak envelope amplitude and sets a fraction of this peak—as a form of a CFD—as the threshold for the next repetition of the expanded time sinusoidal burst. Thus, a consistent detection point can be set on a selected cycle in the burst. This approach, while effective, has two limitations. First, rapid pulse-to-pulse variations are not tracked since the peak of one pulse is used to set a threshold on the next pulse. Second, detection does not occur at the zero axis crossings of the sinewaves where the voltage rate of change is fastest and detection can be accomplished with a minimum of noise and error. Thus, a better approach is needed for varying targets and for higher accuracy.

U.S. Pat. No. 5,457,990, "Method and Apparatus for Determining a Fluid Level in the Vicinity of a Transmission Line," by Oswald et al, discloses a detection technique employing a threshold detector to define an analysis window of time. Whenever pulse amplitude exceeds the threshold, a TOP detector is enabled and detection occurs. The analysis window gates out noise outside the window. However, the '990 patent fails to teach detection of multiple sinusoids in a burst—it is limited to single transients. Multiple cycles within a burst present an ambiguity as to which cycle to detect, and this problem is not addressed in the '990 patent. Furthermore, the '990 patent is limited to an analysis window derived from a single transient above threshold. A sinusoidal burst is not a transient. Thus, an entirely new technique is needed.

SUMMARY OF THE INVENTION

The present invention provides a detection system for expanded time radar, laser, or TDR sensors, which can include, but is not limited to, (1) a transmitter for transmitting a transmit burst, wherein the burst comprises two or more of RF sinusoidal cycles, (2) a receiver for receiving the transmit burst and echoes of the transmit burst and for producing an expanded time receiver output, wherein the receiver output comprises a detected transmit burst and a detected echo burst, (3) a transmit pulse detector for producing a start pulse when the detected transmit burst exceeds an amplitude threshold, (4) an envelope detector for producing an envelope pulse of the detected echo burst, wherein the envelope pulse includes a voltage peak, (5) a threshold detector for producing an analysis window if the envelope pulse exceeds a threshold value, (6) a time-of-peak detector for detecting the voltage peak and for producing a TOP pulse, (7) a comparator for threshold detecting sinusoidal cycles within the detected echo burst and for producing a carrier signal, and (8) a receive echo detector for producing a stop pulse during the analysis window in response to the TOP pulse and the carrier signal.

The system can also include a processor for measuring the start to stop pulse interval to determine echo range. Additionally, the system can include a gate to form a PWM pulse having a pulse width proportional the interval between the start and stop pulses, and a processor for measuring the PWM pulse width to determine echo range. Furthermore, the system can include a transmit pulse detector for producing a start pulse after the detected transmit burst exceeds an amplitude threshold N successive times, where N is an integer representing each sinusoidal cycle within the burst.

The invention includes a method for detecting expanded time radar, laser or TDR signals, comprising: (1) transmitting an RF burst of sinusoidal cycles, (2) sampling transmitted RF burst and a receive echo burst to produce a detected transmit burst and a detected echo burst, (3) threshold detecting the detected transmit burst to produce a start pulse, (4) threshold detecting the detected echo burst to produce a carrier signal, (5) envelope detecting the detected echo burst to produce an envelope pulse, (6) time-of-peak detecting the envelope pulse to produce a TOP pulse, (7) threshold detecting the envelope pulse to produce an analysis window of time, and (8) producing a stop pulse during the analysis window in response to the TOP pulse and the carrier signal. The method can further include processing the start pulse and the stop pulse to produce a range measurement.

The invention also provides a carrier phase detector for expanded time radar, laser, or TDR sensors, and includes (1) a transceiver (i.e., a transmitter-receiver including a common RF port) for producing a detected echo burst, wherein the detected echo burst comprises a limited number of sinusoidal cycles, (2) an envelope detector for producing an envelope pulse of the detected echo burst, wherein the envelope pulse includes a voltage peak, (3) a threshold detector for producing an analysis window if the envelope pulse exceeds a threshold value, (4) a time-ofeak detector for detecting the voltage peak and for producing a TOP pulse, (5) a comparator for threshold detecting sinusoidal cycles within the detected echo burst and for producing a carrier signal, and (6) a receive echo detector for producing an output pulse during the analysis window in response to the TOP pulse and the carrier signal.

Further, the invention provides a TDR sensor, including: (1) a transmitter for producing a transmit burst, wherein the burst consists of two or more of RF cycles, (2) a receiver for detecting echoes of the transmit burst and for producing an expanded time detected echo burst, (3) a transmission line probe coupled to the transmitter and to the receiver for conducting transmit and echo bursts, wherein the echo bursts are reflected transmit bursts from a liquid or other material in contact with, or close proximity to, the transmission line, (4) a threshold detector for producing an analysis window of time that is at least two cycles of the detected echo burst in duration if the detected echo burst exceeds a threshold value, (5) an analyzer responsive to a characteristic of the detected echo burst during the analysis window for producing an range pulse. The TDR sensor can also include a receiver for receiving the transmit burst and echoes of the transmit burst, and for producing an expanded time receiver output, wherein the receiver output consists of a detected transmit burst and a detected echo burst. Additionally, the TDR sensor can further include a processor responsive to the range pulse for measuring echo range. Also, the TDR sensor can further include a processor responsive to the detected transmit burst and the range pulse for measuring echo range. The TDR sensor can operate with a transmission line probe that is an electromagnetic guide wire or a Goubau line.

The present invention can be used in expanded time radar, laser, and TDR ranging systems as a high accuracy detection system that exhibits high accuracy, high dynamic range and excellent immunity to noise. Applications include pulse echo rangefinders for tank level measurement, environmental monitoring, industrial and robotic controls, digital handwriting capture, imaging radars, vehicle backup and collision warning radars, and universal object/obstacle detection and ranging.

One object of the present invention is to provide a precision pulsed RF radar pulse detection system. A further object is to provide a precision pulsed RF radar pulse detection system with high immunity to noise, interference and baseline clutter. Another object of the present invention is to provide a precision pulse detection system for TDR systems employing pulsed RF bursts.

DETAILED DESCRIPTION OF THE INVENTION

A detailed description of the present invention is provided below with reference to the figures. While illustrative component values and circuit parameters are given, other embodiments can be constructed with other component values and circuit parameters. All U.S. patents and copending U.S. applications cited herein are herein incorporated by reference.

General Description

The present invention overcomes the limitations of the various prior detection techniques by detecting the time-of-peak (TOP) of the expanded time RF burst envelope within an analysis window of time and then using that detection event to gate a carrier phase detector. The carrier phase detector detects the zero axis crossings of each sinewave cycle within a burst. The zero axis crossing of a selected cycle is gated by the TOP detection. Therefore, the accuracy of the detection is directly tied to the selected sinewave zero axis crossing, which is highly accuracy, and not to the TOP accuracy. Furthermore, the zero axis crossing occurrence time is amplitude independent and has the greatest immunity to noise. Noise can include random thermal noise, RF interference, and baseline clutter from undesired echoes. The use of the term sinewave can also include other repetitive waveforms, such as clipped sinewaves, triangle waves, etc, although the waveshape is generally sinusoidal due to the beneficial use of bandpass filters in the receive path.

Specific Description

Figure 1:
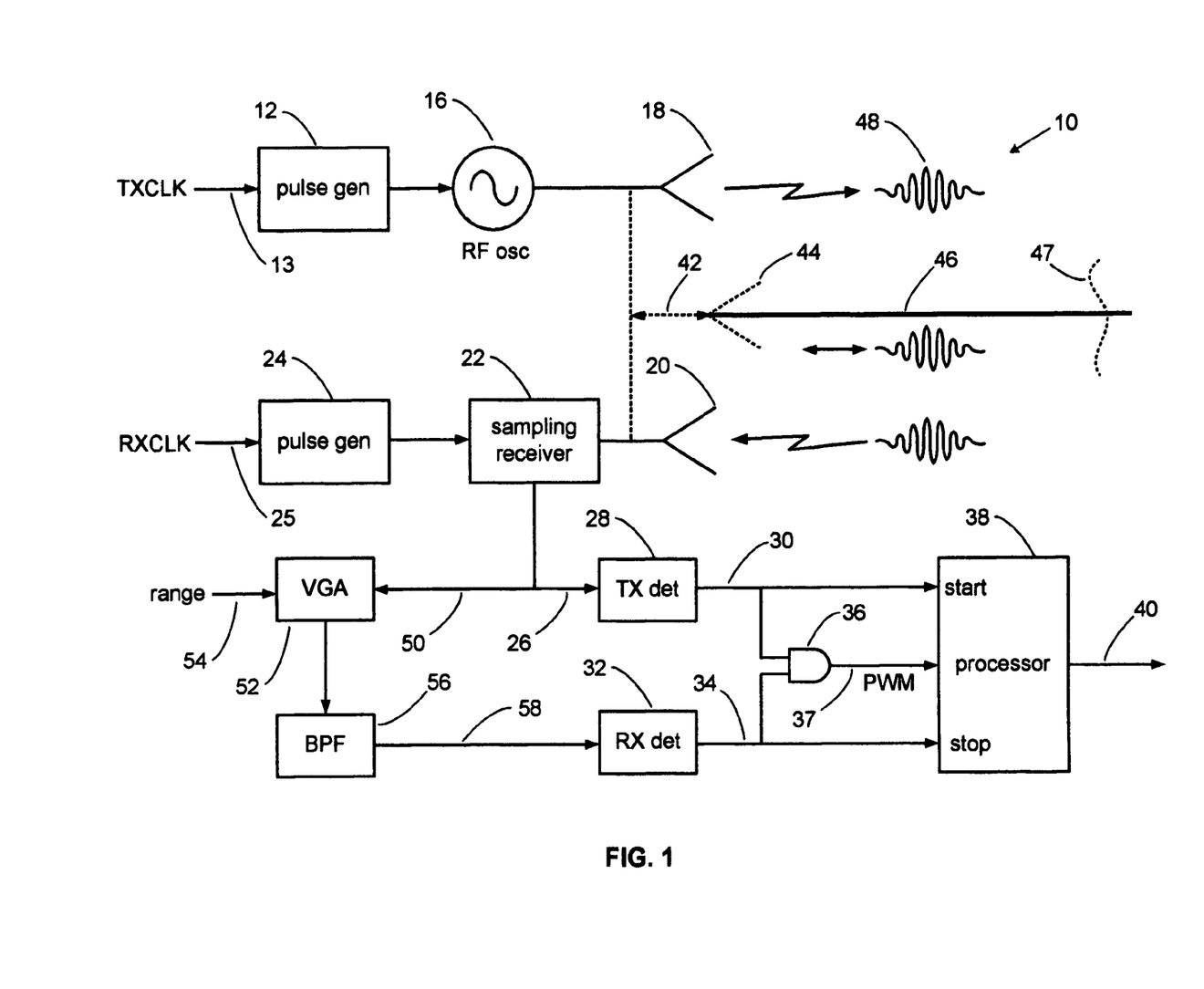
FIG. 1 is a radar sensor block diagram including the detection system of the present invention.

Turning now to the drawings, FIG. 1 is a block diagram showing a general configuration of a carrier phase detection system 10 of the present invention. A transmit clock signal on line 13, labeled TXCLK, triggers a pulse generator 12, which produces pulses at the TXCLK rate. The pulses gate-on an RF oscillator 16, which is coupled to a radiating element 18, which can be an antenna or an optical device such as a laser or LED. The radiated pulse waveform 48 includes a predetermined number of RF cycles. If the radiated signal is a microwave signal, waveform 48 represents the radiated electric field. If the radiated signal is optical, waveform 48 indicates amplitude modulation of light intensity. The TXCLK, pulse generator 12, RF oscillator 16 and radiator 18 form a transmitter.

A receive dock signal on line 25, labeled RXCLK, triggers a pulse generator 24, which produces pulses at the RXCLK rate. The pulses gate a sampling receiver 22, which samples signals from receiving element 20. Receiving element 20 often can be configured as an antenna for microwave radiation. However when operating at predetermined optical frequencies, element 20 can be arranged as a photodetector such as, but not limited to, an avalanche CCD photodetector, a photomultiplier a photodiode, or any photodetector known by those skilled in the art that can receive desired frequencies within the spirit and scope of the present invention. The RXCLK, pulse generator 24, sampling receiver 22 and receiving element 20 form a receiver.

The radiating and receiving elements can be combined into a single transmit-receive antenna 44 or a single lens, again indicated at 44, for bidirectional operation as indicated by line 42 and element 44. Element 44 can also be a launcher for a time domain reflectometer employing an electromagnetic guide wire or a Goubau line for use as an "electronic dipstick" or tank level sensor.

Sampling receiver 22 samples echoes at the RXCLK rate and produces expanded time sampled echo signals on line 26. Several dozen samples can be continuously integrated together before being output on line 26. The time expansion effect is caused by sampling at an offset frequency from the transmit pulses, in a similar fashion to observing a rapidly rotating fan blade that appears to rotate slowly under a strobe light set to a strobe frequency that differs slightly from the blades' rotational rate. Accordingly, radars of this type are termed stroboscopic radars since they make realtime pulses propagating at the speed of light appear to propagate far slower, e.g., at the speed of sound. Expanded time signals are far easier to process accurately since the processing bandwidth is reduced in proportion to the time expansion factor. Time expansion is set by the TXCLK to RXCLK frequency difference A relative to the TXCLK frequency. That is, the time expansion factor=(TXCLK frequency)/$\Delta$. Exemplary parameters are TXCLK frequency=2 MHz, $\Delta$=10 Hz and the expansion factor=200,000.

Expanded time sampled transmit and echo signals are output from receiver 22 on line 26 and coupled to a transmit pulse detector 28. Sampled transmit signals are present due to unavoidable proximity coupling between antennas 18, 20, or optical elements 18, 20, or via the dashed line between elements 18, 20 when a single element 44 is used. Transmit pulse detector 28 outputs a start signal on line 30.

Sampling receiver 22 also outputs a sampled echo signal on line 50 to an optional variable gain amplifier 52, or VGA, which is responsive to a range ramp input on line 54. The range ramp increase VGA gain as the sampling receiver samples signals at greater ranges. Thus, echo amplitude versus range is held constant. Such a feature, while beneficial, is not essential to the invention.

The VGA output is coupled to bandpass filter (BPF) 56, which rejects noise while passing expanded time replica echoes of radiated signal 48 along line 58. For illustrative purposes, exemplary frequencies can be arranged with 6 GHz for the sinusoids in waveform 48, and 6 kHz for the expanded time sinusoids output from receiver 22. In such an example embodiment, BPF 56 has a passband centered at 6 kHz. BPF 56 is coupled to a receive pulse detector 32. The output of receive pulse detector 32 is a stop signal on line 34. The time interval between the start signal on line 30 and the stop signal on line 34 defines echo range. Optionally, the start and stop signals can be coupled to gate 36 to form a pulse width modulation (PWM) signal on line 37. The pulse width of the PWM signal is proportional the time interval between the start and stop pulses and thereby indicates echo range.

An optional processor 38 can be used to perform various processing functions known in the art, such as averaging, range calibration and scaling, range error correction, etc. Processor 38 outputs on line 40 for display, memory or control functions. Processor 38 can determine echo range from the time interval between the start and stop signals or from the PWM signal.

Figure 2A:
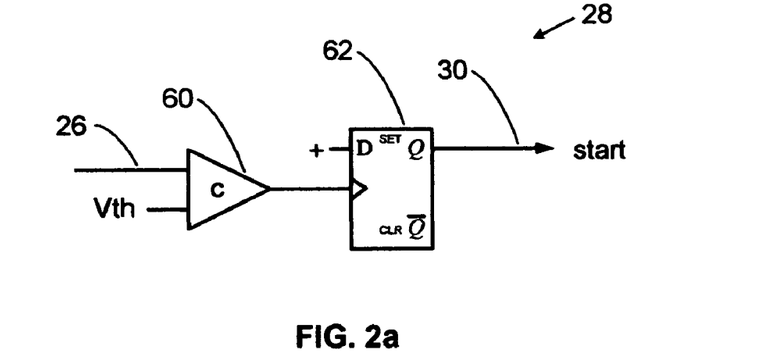
FIG. 2*a* depicts a first pulse start detector.

FIG. 2a depicts an embodiment of transmit detector 28. It includes a comparator 60 for detecting the detected transmit burst signals on line 26 when the burst amplitude exceeds a threshold Vth. Comparator 60 triggers latch 62, which outputs a start signal on line 30. For clarity, a reset line coupled to latch 62 is not shown.

Figure 2B:
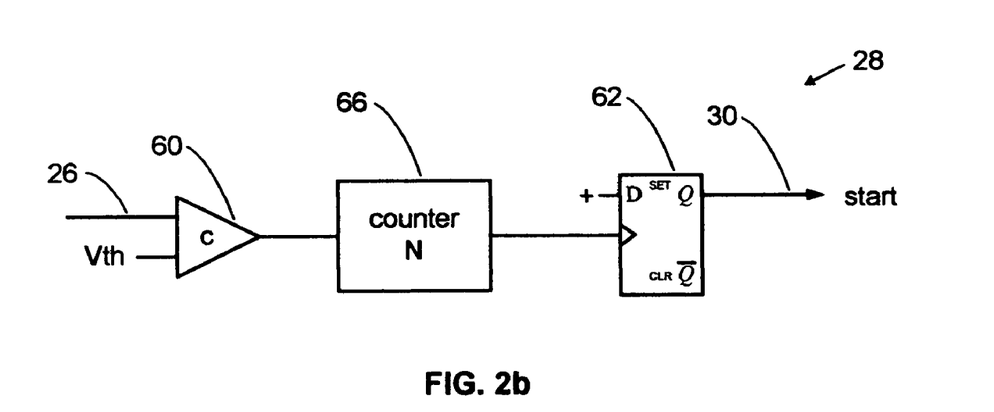
FIG. 2*b* depicts an Nth pulse start detector.

FIG. 2b depicts another embodiment of transmit detector 28 that further includes a divide-by-N counter 66 in addition to comparator 60 for detecting the detected transmit burst signals on line 26 when the burst amplitude exceeds a threshold Vth. Counter 66 thus counts successive sinewave cycles detected by comparator 60 and outputs a trigger signal to latch 62 after N cycles have occurred. Accordingly, the start signal on line 30 corresponds to the Nth cycle of the detected transmit burst signal. Thus, transmit detector 28 of FIG. 2a detects the first cycle above threshold Vth, while transmit detector 28 of FIG. 2b detects the Nth successive cycle above threshold Vth. N can be beneficially set to match the selected cycle detected by receive detector 32, thereby canceling errors resulting from frequency drift in the RF burst. In practice, the expanded time detector of FIG. 2a, when used in the system of FIG. 1, can be stable to a realtime equivalent of several picoseconds over a wide temperature range when RF oscillator 16 employs SiGe transistors at 6 GHz.

Figure 3:
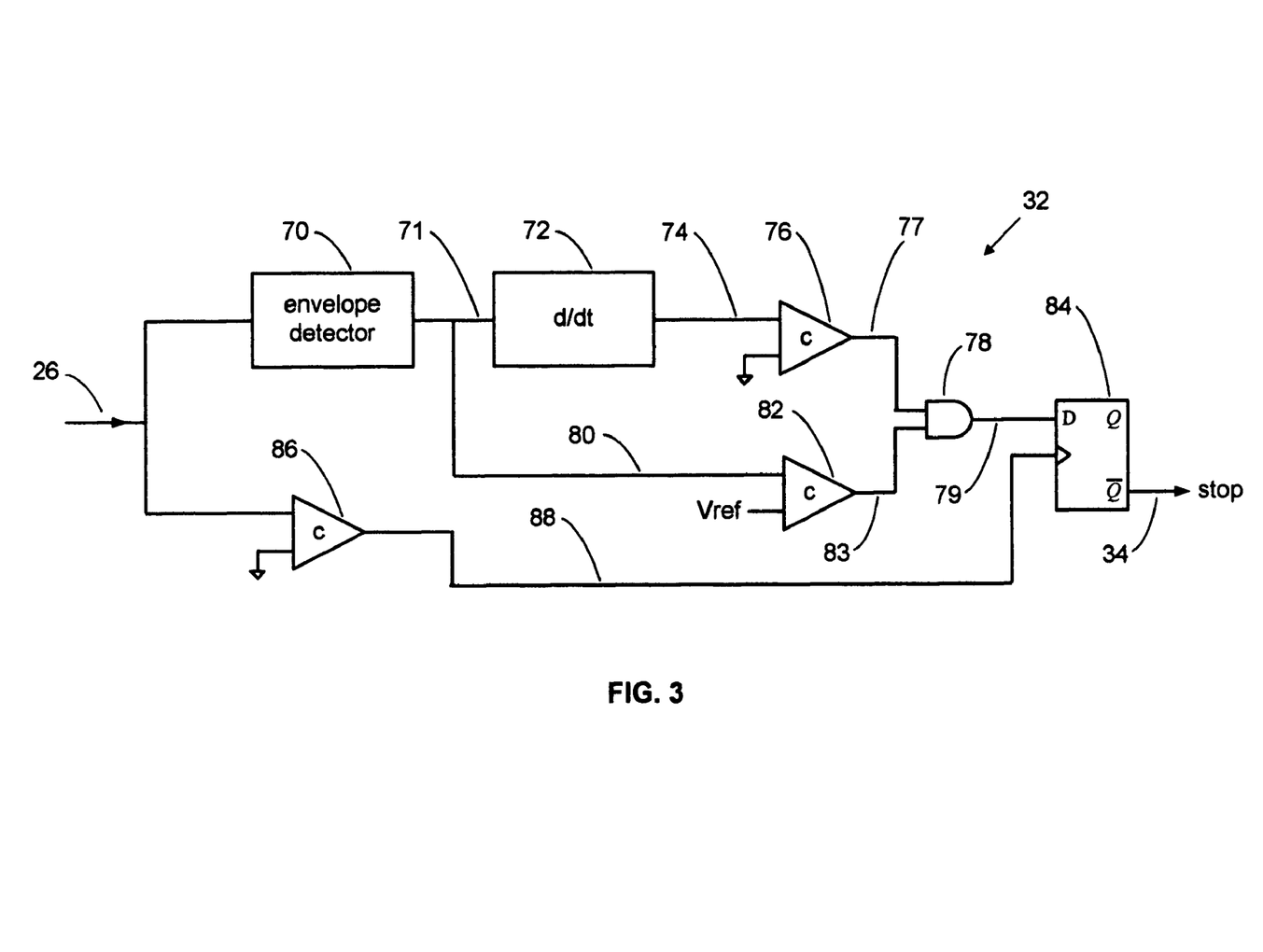
FIG. 3 is a diagram of a carrier phase detector.

FIG. 3 is an block diagram of an embodiment of a receive detector 32, i.e., a carrier phase detector. Carrier phase refers to the phase, or temporal location of the sinusoids in the detected echo burst. This phase varies with range, since the entire burst, and the phase of the sinusoids within the burst, occurs at a temporal location corresponding to physical range. Thus, detecting carrier phase is inherently a high accuracy range detection modality.

Walking though the functional blocks in FIG. 3, the detected echo burst is input on line 26 to an envelope detector 70, which outputs an envelope signal on line 71, whereby the envelope corresponds to a curve fitted to the sinusoidal peaks of the detected echo burst. The envelope signal on line 71 is differentiated by a differentiator 72 and output on line 74. A comparator 76 detects a zero crossing of the voltage on line 74, which corresponds to the time-of-peak (TOP) of the envelope signal. The TOP is approximately the center of the envelope signal.

A comparator 82 outputs a threshold signal on line 83 whenever the envelope signal received along line 80 is above a predetermined threshold Vref. The threshold signal defines an analysis window of time. No output from the receive detector can occur outside the analysis window. Accordingly, noise and spurious response are automatically eliminated outside the analysis window. Within the analysis window, gate 78 sets the D input of a latch 84 high via line 79, and this high level is clocked through to the Q-bar output on line 34 at the next carrier phase signal transition on line 88. The Q-bar output is the measurement stop signal. A comparator 86 triggers on zero crossings of the detected receive bursts and outputs a carrier phase signal on line 88. The first carrier phase transition that occurs after the D-input is set high on line 79 toggles latch 84 and effects a receive detection on a selected sinusoid within the detected receive burst. Connections to latch 84 to hold it high until reset are not shown for clarity.

Figure 4:
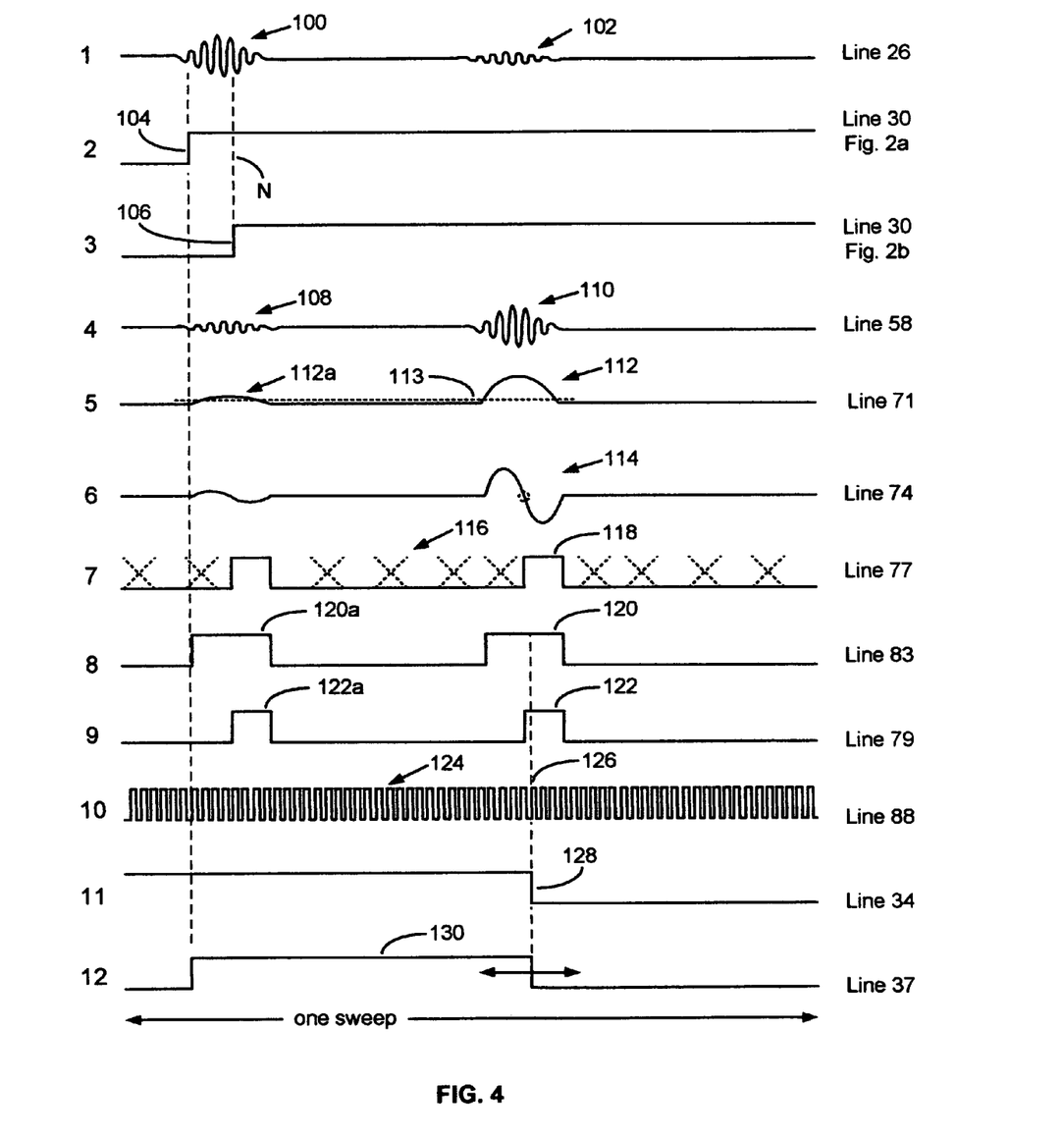
FIG. 4 is a timing diagram for the system of FIGS. 1, 2 and 3.

FIG. 4 is an exemplary timing diagram for the detection system of FIGS. 1, 2, and 3. Referring to trace numbers at the left of each trace, trace 1 indicates the detection signals on line 26 from receiver 22. Burst 100 is the detected transmit burst and burst 102 is the detected receive burst. Trace 2 is the transmit detector 28 output on line 30 of FIG. 2a, and its edge 104 is aligned with the first sinusoid in burst 100 to exceed threshold Vth. Threshold Vth is not shown for clarity. Alternatively, the transmit detector output 28 on line 30 of FIG. 2b, which includes a count-to-N counter, so detection edge 106 is aligned with the Nth sinusoid in burst 100 to exceed threshold Vth. N can be set to correspond to the detected cycle within the echo burst for optimal tracking of errors.

Trace 4 in FIG. 4 is the detected echo burst after passing through VGA 52 and BPF 56. The VGA attenuates detected transmit burst 100 into a small burst 108. In practice, burst 108 is almost totally attenuated by the VGA. Burst 102 is amplified by the VGA into burst 110, which can be substantially constant over a wide span of echo ranges. However, target cross-section can cause the amplitude of echo burst 110 to vary widely. Thus, for precision detection of the temporal location of burst 110, it is beneficial to detect a zero axis crossing of one of the stronger sinusoids in burst 110.

Trace 5 is the output 112 of envelope detector 70 on line 71 of FIG. 3. It is effectively a curve fitted to full-wave rectified sinusoid peaks of burst 110. Threshold Vref is indicated by a dashed line 113. Whenever output 112 is above threshold 113 (shown as a dashed line) comparator 82, as shown in FIG. 3, outputs a signal 120 as seen in trace 8. Signal 120 defines the analysis window of time.

Envelope signal 112 is differentiated by differentiator 72, as shown in FIG. 3, and output on line 74 as a derivative signal 114 as shown in trace 6. Comparator 76 outputs pulse 118 of trace 7 in response to derivative signal 114. The dashed "X" markings of trace 7 indicate nearly continuous, but somewhat random, pulses similar to pulse 118 due to comparator 76 triggering on baseline noise. Once a strong signal is present, e.g., pulse 114, then a relatively noise-free pulse 118 is produced. Gate 78 outputs pulse 122 of trace 9 on line 79, as shown in FIG. 3, whenever pulses 118 and 120 are high. Pulse 122 is applied to the D input of latch 84, and the stage is set for latch 84 to toggle on the next carrier phase signal edge, as shown by the dashed line, on line 88. Trace 10 indicates the carrier phase signal (i.e., waveform 124) on line 88, as shown in FIG. 3, which is provided by comparator 86. Comparator 86 is referenced to ground, i.e., to zero, so it toggles on the slightest noise as well as the intended burst signal 110. Thus, its output 124 is seen as a continuous waveform. Optionally, comparator 86 can be referenced to a non-zero voltage, to implement hysteresis or to eliminate noise outside the analysis window. The cycles in waveform 124 outside analysis window 120 are noisy and generally of a period set by BPF 56 of FIG. 1. Consequently, waveform 124 resembles a somewhat continuous waveform, but only the cycles within the analysis window 120 (e.g., specifically pulse 126) are able to trigger latch 84, as shown in FIG. 3) and produce a stop signal. Trace 11 shows the stop signal on line 34 with an edge (shown along the dashed line) corresponding to the first clock edge occurring after both analysis window pulse 120 and TOP pulse 122 go high.

Trace 12 is a PWM pulse 130 output from gate 36 of FIG. 1, with a leading edge aligned (shown aligned with the first dashed line) with start signal edge 104 (or 106) and a trailing edge aligned (shown aligned with the second dashed line) with the stop signal edge 128. The trailing edge of PWM pulse 130 increases in proportion to echo range. The bottom line in FIG. 4 indicates the time span for all the traces. The time span covers one sweep of the radar, e.g., as defined by the offset frequency Δ. One sweep can be on the order of 100 ms in time.

Derivative waveform 114, as shown in trace 6, is often produced by a differentiator configuration implemented with a simple resistor-capacitor, or RC, differentiator. An RC dfferentiator, as known in the art, can introduce some lag in the zero axis crossing of its output, indicated by the dashed "O" in waveform 114. However, the RC parameters of the present invention can be set to provide an optimal detection margin between the "O" and a transition in waveform 124, so the two do not occur at the same time. This assures the stop output is time aligned with a carrier phase transition in waveform 124 and not the TOP zero crossing "O".

The success of this TOP method of FIG. 3 depends on the stability and consistency of envelope 112. Thus, the emitted waveform 48 must be stable. Laboratory tests indicate that waveform 48 is essentially invariant with temperature variation when SiGe transistors are employed in RF oscillator 16 at 6 GHz, so the invention can be practically realized with commonly available components.

Figure 5:
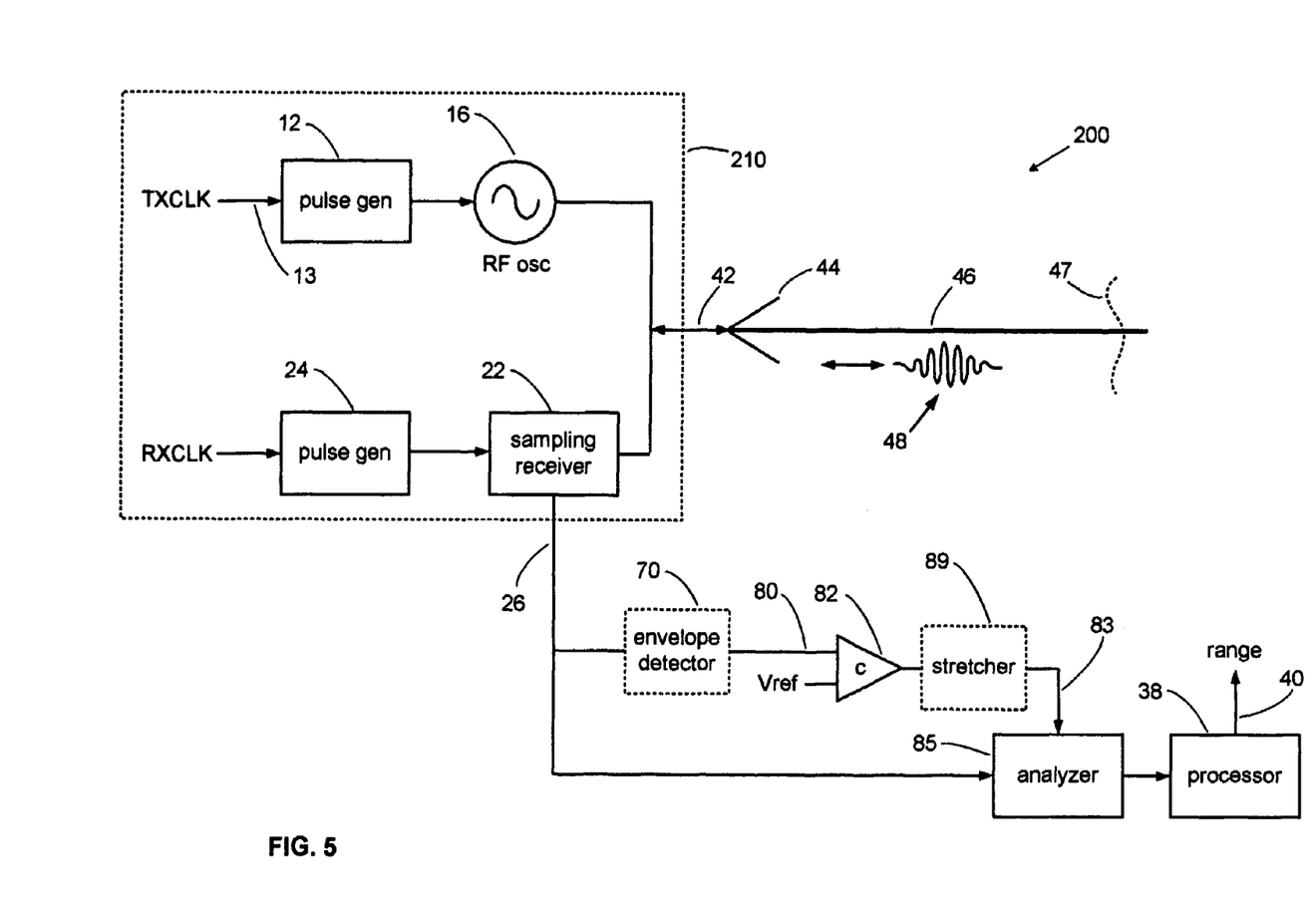
FIG. 5 is a block diagram of a TDR system including a carrier phase detector of the present invention.

FIG. 5 is a block diagram showing a general configuration of a carrier phase detection system 200 in a TDR configuration. Transmitter and receiver elements, as indicated by dashed block 210 are as described with respect to FIG. 1. A conductor 42 connects transmitter-receiver 210 to a pulse launcher 44, which launches RF bursts 48 onto transmission line probe 46. Object 47 reflects echo pulses back to launcher 44, which also acts as a receive element, and coupled to a receiver 22 via conductor 42. Object 47 can be a liquid surface in a tank, a material, e.g., corn in a silo, a sliding element, such as a piston in a cylinder, or countless other reflecting materials. Launcher 44 is beneficial when transmission line 46 is an electromagnetic guide wire or a Goubau line. It is not required with some transmission line geometries, such as coaxial, microstrip or balanced twin line, and so launcher 44 can be optional depending on transmission line probe 46.

A receive clock signal, labeled RXCLK, triggers a pulse generator 24 so as to gate a receiver 22. Receiver 22 after receiving such a gate signal, outputs a detected echo burst on line 26 to optional envelope detector 70, which performs as described with respect to FIGS. 3 and 4. Comparator 82 outputs an analysis window pulse on line 83 as described with respect to FIGS. 3 and 4. Line 83 is coupled to an analyzer 85 which may include TOP detection as described with respect to FIG. 3, or it may contain other signal processing circuits, such as a CFD. Analyzer 83 is enabled by the analysis window pulse 120 on line 83. Analyzer 85 outputs a stop signal to processor 38. Processor 38 can be responsive to start pulse 104 (or 106), as shown by traces 2 and 3 of FIG. 4, or other range measurement signals, e.g., a signal derived from a range ramp, to produce a range output on line 40. Processor 38 can average, scale, offset, error correct, and perform other such functions.

Envelope detector 70 can be omitted and a pulse stretcher 89 can be used as another example arrangement. In this configuration, comparator 82 triggers directly on a detected echo burst sinusoid received along line 80 exceeding threshold Vref, and it triggers pulse stretcher 89, e.g., a monostable multivibrator, to produce an analysis window pulse 120, as shown in trace 8 of FIG. 4.

TDR system 200 is responsive to sinusoidal echo burst signals within an analysis window of time, and can produce accurate range measurements by detecting a selected detected echo burst characteristic within the analysis window. An echo burst characteristic can include its amplitude, the amplitude of its detected envelope, its zero crossings or its differentiated envelope zero crossing, its envelope time-of-peak, its geometric mean, etc.

Figure 6:
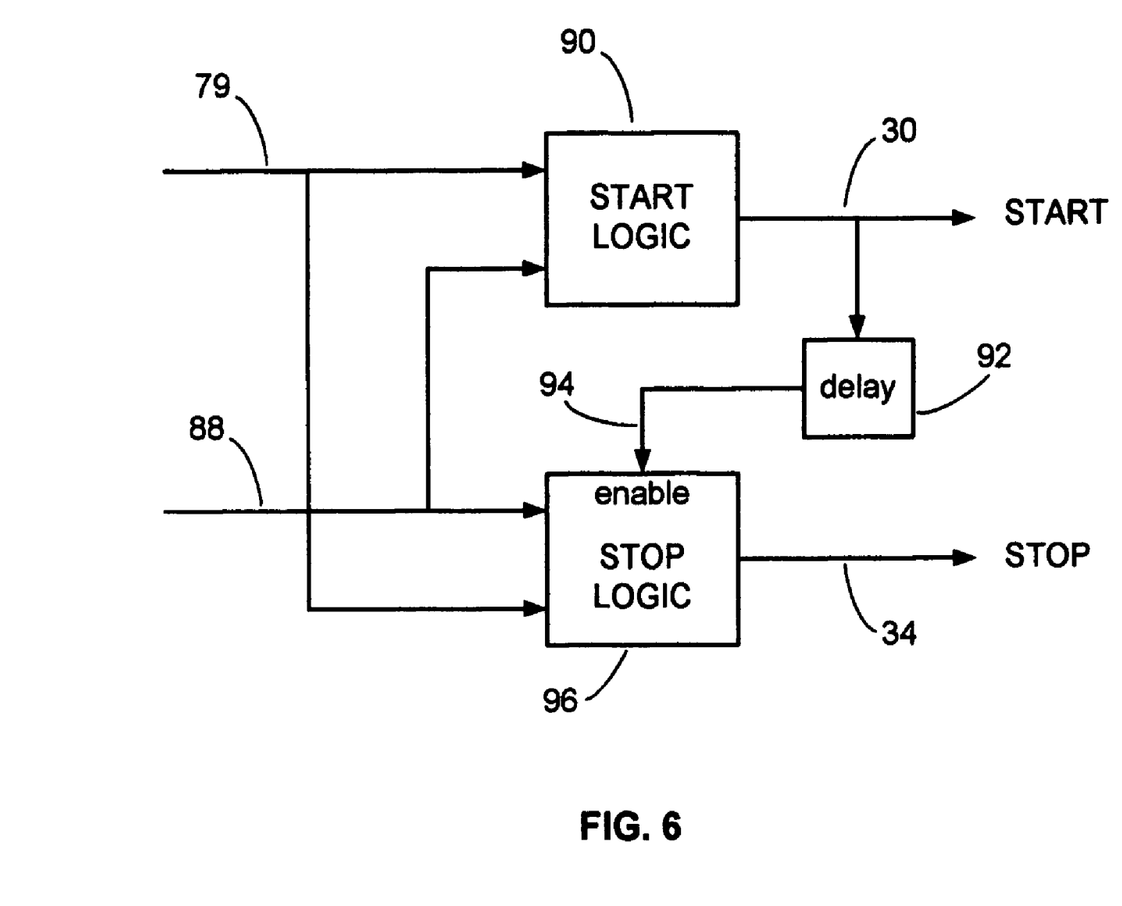
FIG. 6 is another detector logic configuration.

FIG. 6 is a block diagram of another detector logic configuration beneficial to the system of FIG. 1 or FIG. 5. Line 79, also shown in FIG. 3, couples pulse 122 and pulse 122a of trace 9 in FIG. 4 to a START LOGIC circuit 90 and a STOP LOGIC circuit 96. Pulse 122 is produced as described in reference to FIGS. 3 and 4. Pulse 122a is produced from a detected transmit burst pulse 108 rather than a detected echo burst pulse 110; otherwise the detection process is similar for both pulses. Comparator 82 produces an transmit analysis window of time, as indicated by pulse 120a of FIG. 4, when detected transmit pulse envelope 112a is above a threshold 113. Comparator 82 also produces a receive analysis window of time, as indicated by pulse 120 of FIG. 4, when detected echo pulse envelope 112 is above a threshold 113. Exemplary threshold 113 is the same for both transmit and echo pulses; however, it can differ as a design choice.

Line 88 couples detected carrier phase pulses 124 of trace 10 in FIG. 4 to circuits 90 and 96. START LOGIC circuit 90 outputs a START pulse on a first trigger edge to occur after pulse 122a goes high, effecting carrier phase detection of the detected transmit pulse. This is similar to edge detection 126 of trace 10 as shown for stop detection during pulse 122 but occurs during pulse 122a for start detection. This process is repeated by STOP LOGIC circuit 96 for pulse 122 and carrier phase pulses 124, effecting carrier phase detection of the detected echo pulse as indicated by dashed line 126 and pulse edge 128 of FIG. 4. Optional delay element 92 provides a delayed enable to STOP LOGIC circuit 96 to set a minimum transmit-to-receive range in order to blank out false receive triggers on the main bang and close range clutter. A benefit to the configuration of FIG. 6 is timing variations in BPF 56 and detector elements 70, 72, 76, 78 and 86 affect both the transmit and echo detection times equally and thus cancel out of the range measurement. Timing variations in receiver 22 also cancel, while timing variations in VGA 52, gate 36 and processor 38 can be designed using common components to be negligible, since these elements operate in expanded time. The circuit benefits from detecting zero axis crossings of detected carrier pulses 108 and 110, rendering timing accuracy independent of signal amplitude. A further benefit occurs when START and STOP detections occur on the same cycle within bursts 108 and 110, rendering timing accuracy independent of cycle period within bursts 108 and 110, i.e., independent of RF frequency. Accordingly, realtime offset errors of less than 1-picosecond, or 0.15 mm in range, can be realized without recourse to calibration or trimming.

Time-of-peak detection is an exemplary detection mode. Other detection modes can be implemented during the transmit and receive analysis windows of time that trigger on a characteristic of the detected burst signals, e.g., zero axis crossings, fractional maximum detection, pulse centroid detection, offset time-of-peak detection, etc.

The use of the word "radar" herein refers to traditional electromagnetic radar that employs microwaves or millimeter waves, and it also refers to optical radar, i.e., laser rangefinders, as well as guided wave radar, wherein radar pulses are guided along a electromagnetic guide wire or other conductor, as in TDR. "Radar" includes monostatic and bistatic systems, as well as radars having a single antenna/transducer. Frequency offset generally refers to an offset frequency between 1 and 1000 Hz between transmit and receive clock signals. However, the scope of the invention also encompasses larger offsets as may be required in various applications. Changes and modifications in the specifically described embodiments can be carried out without departing from the scope of the invention which is intended to be limited only by the scope of the appended claims.

What is claimed is:

1. A detection system for expanded time microwave or millimeter wave radars, optical radars or time domain reflectometers, comprising:
   a transmitter for transmitting a transmit burst, wherein the burst comprises two or more cycles of radio frequency waves or amplitude modulated light waves,
   a receiver for receiving the transmit burst and echoes of the transmit burst and for producing an expanded time receiver output, wherein the receiver output comprises a detected transmit burst and a detected echo burst,
   a threshold detector for producing an analysis window that is at least two cycles of the detected echo burst in duration if the detected echo burst exceeds a threshold value,
   a pulse envelope detector for producing an envelope pulse of the detected echo burst, wherein the envelope pulse includes a voltage peak,
   a time-of-peak detector for detecting the voltage peak and for producing a time-of-peak pulse,
   a comparator for threshold detecting cycles within the detected echo burst and for producing a carrier signal; and
   a receive echo detector for producing a stop pulse during the analysis window in response to the time-of-peak pulse and the carrier signal.

2. The system of claim 1 further comprising a transmit pulse detector responsive to the detected transmit burst for producing a start pulse when the detected transmit burst exceeds an amplitude threshold.

3. The system of claim 1 further comprising a transmit pulse detector for producing a range measurement start pulse when the detected transmit burst exceeds an amplitude threshold N successive times, where N is an integer representing successive cycles within the burst.

4. The system of claim 1 further comprising a threshold detector for producing a transmit analysis window that is at least two cycles of the detected transmit burst in duration if the detected transmit burst exceeds a threshold value, and for producing a receive analysis window that is at least two cycles of the detected echo burst in duration if the detected echo burst exceeds a threshold value.

5. The system of claim 4 further comprising a start logic circuit for producing a range measurement start pulse during the transmit analysis window and a stop logic circuit for producing a range measurement stop pulse during the receive analysis window.

6. The system of any one of claims 1-5 further comprising a processor for measuring the start to stop pulse interval to determine echo range.

7. The system of claim 6 further comprising a gate to form a PWM pulse having a pulse width proportional the interval between the start and stop pulses, and a processor for measuring the PWM pulse width to determine echo range.

8. A method for detecting expanded time microwave or millimeter wave radar signals or optical radar signals or time domain reflectometer signals, comprising:
   transmitting a burst comprised of two or more cycles of radio frequency waves or amplitude modulated light waves to produce an echo burst, sampling the transmitted burst and the receive echo burst to produce a detected transmit burst and a detected echo burst, threshold detecting the detected echo burst to produce a carrier signal, envelope detecting the detected echo burst to produce an envelope pulse, time-of-peak detecting the envelope pulse to produce a time-of-peak pulse, producing a receive analysis window if the detected echo burst amplitude exceeds a threshold; and producing a stop pulse during the analysis window in response to the time-of-peak pulse and the carrier signal.

9. The method of claim 8 further comprising threshold detecting the detected transmit burst to produce a start pulse, and processing the start pulse and the stop pulses to produce a range measurement.

10. The method of claim 8 further comprising producing a transmit analysis window of time if the detected transmit burst exceeds a threshold, and producing a start pulse during the transmit analysis window in response to a characteristic of the detected transmit burst.

11. A time domain reflectometer, comprising:
a transmitter for producing a transmit burst, wherein the burst comprises two or more cycles of radio frequency waves a receiver for detecting echoes of the transmit burst and for producing an expanded time detected echo burst, a transmission line probe coupled to the transmitter and to the receiver for conducting transmit and echo bursts, wherein the echo bursts are reflected transmit bursts from a liquid or other material in contact with, or in close proximity to, the transmission line probe, a threshold detector for producing an analysis window that is at least two cycles of the detected echo burst in duration if the detected echo burst exceeds a threshold value, an analyzer responsive to a characteristic of the detected echo burst for producing range counter stop pulse during the analysis window.

12. The TDR sensor of claim 11 further comprising a receiver for producing an expanded time detected transmit burst and detected echo burst, a detected transmit burst detector for producing a start pulse, a detected echo burst detector for producing a stop pulse, and a processor responsive to the start and stop pulses for measuring echo range.

13. The TDR sensor of either of claims 11 or 12 wherein the transmission line probe is an electromagnetic guide wire or a Goubau line.

* * * * *